No. 813,003. PATENTED FEB. 20, 1906.
A. E. HORSFALL.
APPARATUS FOR ASCERTAINING ERRORS IN THE ALINEMENT OF SHAFTING AND FOR LIKE PURPOSES.
APPLICATION FILED AUG. 14, 1905.

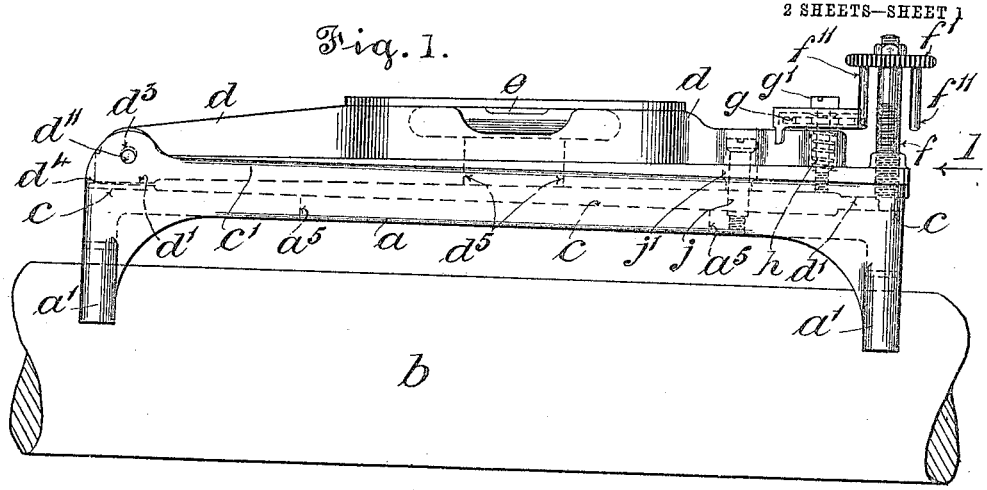

2 SHEETS—SHEET 2.

Witnesses.
Robt A Cissel
Emil Baumely Jr

Inventor.
Arthur E. Horsfall.
by Herbert W. T. Jenner.
Attorney.

UNITED STATES PATENT OFFICE.

ARTHUR EDGAR HORSFALL, OF HALIFAX, ENGLAND.

APPARATUS FOR ASCERTAINING ERRORS IN THE ALINEMENT OF SHAFTING AND FOR LIKE PURPOSES.

No. 813,003.     Specification of Letters Patent.     Patented Feb. 20, 1906.

Application filed August 14, 1905. Serial No. 274,139.

*To all whom it may concern:*

Be it known that I, ARTHUR EDGAR HORSFALL, a subject of King Edward VII of Great Britain, residing at Halifax, in the county of York, England, have invented certain new and useful Improvements in Apparatus for Ascertaining Errors in the Alinement of Shafting and for Like Purposes, of which the following is a specification.

This invention has reference to means for applying to shafting and other bodies having cylindrical or plane surfaces to detect errors in the alinement or level thereof.

The object of my invention is to provide an instrument or apparatus by use of which any error in the alinement of shafting or the like can be readily ascertained, a supplementary scale when adjusted to correspond with the ascertained error per unit length giving the total error in alinement for any given length.

Another object of my invention is the production of means whereby the lateral error in the alinement of cylindrical or plane bodies can be ascertained.

The various new and novel features of my invention will be fully described in the subjoined specification and particularly pointed out in the following claims.

Figure 4:
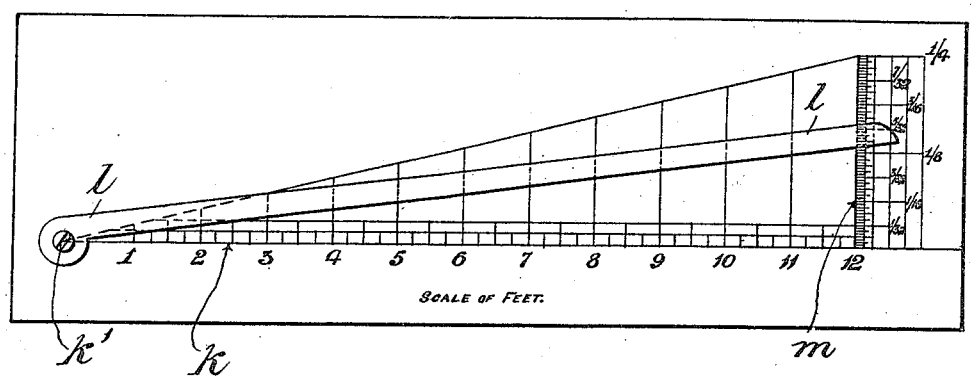
Figure 5:
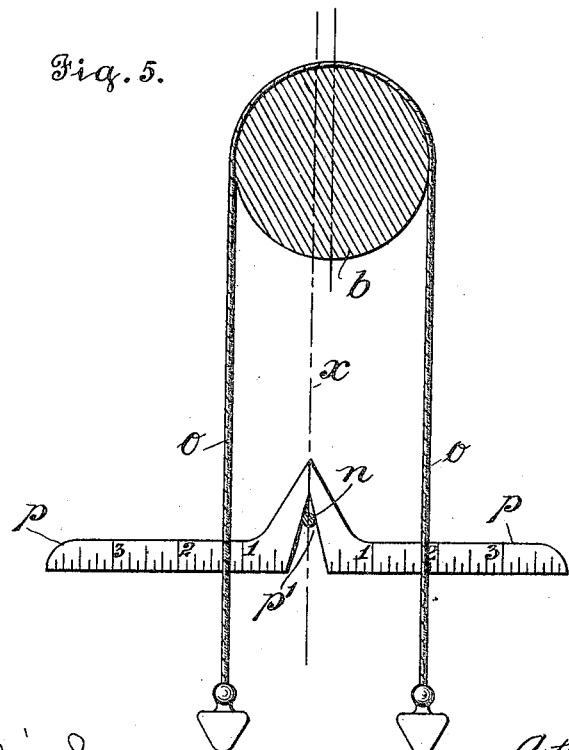

In the accompanying drawings, Figure 1 is a side elevation of my improved apparatus as applied to ascertain the error in alinement of a portion of shaft. Fig. 2 is a plan view of Fig. 1, and Fig. 3 is an end elevation looking in the direction of arrow 1, Fig. 1. Fig. 4 shows the scale I employ in connection with apparatus shown in Figs. 1 to 3 for calculating the total error for any given length, and Fig. 5 shows the means I employ for ascertaining errors in lateral alinement of shafting.

Referring to the drawings, letter $a$ represents a base of convenient length, which may be, say, one foot, two feet, one meter, or other convenient unit. This base is provided at each end with feet or projections $a'$, whose inner surfaces form inclined or inverted-V-shaped bearing-surfaces $a''$, so that the base will center itself when placed longitudinally on a line of shafting, as $b$. The upper surface $c$ of the base $a$ is made parallel with the bearing-surfaces $a''$, so that when the apparatus is placed on a shaft $b$ the said upper surface $c$ is parallel to the longitudinal axis of the shaft. The under sides $a^3$ of the feet $a'$ are also made parallel with the upper surface $c$ to enable the apparatus to be used for leveling or alining plane surfaces, and a parallel longitudinal groove $a^4$, formed in the under side of the base from end to end thereof, enables the apparatus to be used in conjunction with a straight-edge, if so desired.

Between the longitudinal ribs $c'$ on the upper surface of the base is supported a leveling-bar $d$, having a plane under surface $d'$. One end of the bar $d$ is loosely connected to the base by means of a pin $d''$, passing through the ribs $c'$ and through the hole $d^3$ in said bar. Centrally of the bar $d$ and parallel to the plane under surface thereof is fixed a level $e$, of suitable and ordinary construction, preferably, as here shown, a spirit-level having a confined air-bubble.

Openings $d^5$ and $a^5$, formed, respectively, in the bar $d$ and base $a$, permit of access of light to the under side of the level $e$. A small auxiliary level $e'$, placed at right angles to the longitudinal axis of the bar $d$, may be employed to facilitate placing of the base $a$ directly on the crown of the shaft under test.

Through the free end of the bar $d$ passes a vertical adjusting-screw $f$, having a milled head $f'$, with in this instance two pegs or pins $f''$ projecting from the under side thereof. These pegs are adapted as the adjusting-screw $f$ is rotated to engage the star-plate $g$, mounted on the stud $g'$, fast to the bar $d$. A small coiled spring $h$, bearing against the under side of said star-plate $g$, prevents it from being accidentally moved and holds it in the position into which it has been turned by the rotation of the adjusting-screw $f$. The rotation of the adjusting-screw causes the free end of the leveling-bar $d$ to be raised or lowered, as the case may be.

The bar $d$ does not pivot on the pin $d''$, which simply serves to hold it in position on the base, but on its extreme end $d^4$. Letter $i$ represents a cap or cover partly inclosing the star-plate $g$ and having an opening $i'$, through which readings from the said star-plate can be taken, the portion of the plate adjacent the adjusting-screw $f$ being cut away to expose the teeth of the star-wheel to the pins $f''$. The headed screw $j$, fast to the base $a$ and passing through the opening $j'$ in the leveling-bar $d$, limits the movement of said bar and prevents it falling out of position should the apparatus be inverted.

The upper surfaces of the head $f'$ of the adjusting-screw $f$ and of the star-plate $g$ are, as shown in Fig. 2, suitably divided or provided with indicating-marks proportioned to the pitch of the adjusting-screw.

Each division on the star-wheel denotes in the present instance the distance through which the free end of the leveling-bar $d$ is moved each half-revolution of the adjusting-screw, and the divisions on the head $f'$ of the screw denote the distances moved by the leveling-bar for fractional parts of a revolution of the screw.

In employing the apparatus to determine the error in horizontal alinement of a shaft or any other body having a cylindrical or a plane surface it is placed in position on the part to be tested with the star-plate and adjusting-screw at zero. The apparatus is then placed with the adjusting-screw toward the lower end of the shaft or other body, as indicated by the level $e$, and the adjusting-screw $f$ rotated until the level indicates that the bar $d$ occupies a horizontal position.

The indicating-mark on the star-plate $g$, which shows through the opening $i'$, plus the fractional mark on the head of the adjusting-screw, which may be opposite the said opening $i'$, will be the horizontal error in the surface tested per unit length—that is, for each length of the bar $d$. For example, assuming that in the apparatus shown on the drawings the bar $d$ is one foot in length and the screw $f$ has sixteen threads per inch, then one revolution of the screw $f$ will raise or lower the free end of the bar $d$ through one-sixteenth part of an inch. As one revolution of the adjusting-screw will, through the two pegs $f''$, cause the star-plate $g$ to be moved two divisions, each division on the said star-plate equals a movement of one thirty-second part of an inch. Each division on the milled head $f'$ of the adjusting-screw $f$ equals a movement of two two hundred and fifty-sixth parts of an inch. According to the above example of proportioning the parts the reading in Fig. 2 indicates that the shaft $b$ has a longitudinal error of one-eighth plus two two hundred and fifty-sixth parts of an inch per foot of its length. If desired, one peg $f''$ may be employed instead of two, as here shown, in which case the readings of the star wheel or plate will be altered accordingly.

In order that the total amount of horizontal error for any length may be easily and quickly calculated from the error per unit length ascertained as just set forth, I employ a scale constructed as shown in Fig. 4. On this scale the units of length to any desired number—in this instance twelve—together with such subdivisions thereof as may be deemed necessary, are marked off on a horizontal line $k$. At the zero end of the line $k$ is pivoted at $k'$ a pointer $l$, extending the length of the said line, as shown. At the opposite or limit end of the line $k$ a vertical line $m$ is drawn, on which, commencing from the horizontal line, the units of error corresponding to those indicated by the divisions on the head of the adjusting-screw $f$ are marked off vertically, each division in this instance, according to the example previously given, corresponding to an error of one two hundred and fifty-sixth part of an inch per foot. On the free end of the pointer $l$ being moved to that point on the vertical line $m$ corresponding to the number of units of error previously ascertained the total amount of horizontal error for any length is indicated by the length of a vertical line drawn to the pointer from the unit number on the horizontal line $k$ corresponding to such length.

I wish it to be clearly understood that I do not limit myself to the arrangement of proportioning the parts and dividing the head of the adjusting-screw and the star-plate herein shown, as this is only adopted by way of example. Any convenient length of base and pitch of screw may be employed and on any system of measurement, such as the metric system. The divisions on the indicating-disks and on the scale will of course vary with the unit adopted and the pitch of the adjusting-screw.

For ascertaining the lateral error in a shaft at any desired point I employ the arrangement shown in Fig. 5. Directly beneath the shaft $b$ I stretch a cord $n$, following the true longitudinal axis thereof, which is indicated by the dotted line $x$. At the point to be tested I hang over the shaft $b$ a cord $o$, having a weight at each end to insure the cord hanging vertically down from the sides of the shaft. I then place on the cord $n$ a device consisting of a bar or plate $p$, of metal or other suitable material, having measurements marked off equally on either side of its center, as shown. The center of the plate $p$ is formed with a V-shaped recess $p'$, which is passed over the longitudinal cord $n$ and hangs centrally thereon. Half the difference between the measurements indicated on the two sides of the center of the plate or bar $p$ by the vertical portions of the cord $o$ will be the amount of lateral error at that point.

By the means herein described and shown I am enabled to correctly ascertain errors in the horizontal alinement of shafting and other bodies and also the lateral error in alinement of shafting both more quickly and accurately than by the means at present employed.

Having thus described my invention, what I claim as new, and desire to secure by Letters Patent, is—

1. The combination, with a base provided with a bearing-surface on its under side, of a bar arranged above the said base and provided with a sharp edge at one end which rests pivotally on the upper surface of the base, a loose connection which permits the said bar to slide to a limited extent upon the base, a level carried by the said bar, and a screw which adjusts the other end portion of the said bar vertically with relation to the said base.

2. The combination, with a base provided with a bearing-surface on its under side, of a bar supported by the said base and provided with a level, an indicating-screw which moves one end portion of the said bar vertically, a toothed indicating-disk journaled adjacent to the said screw, and a projection carried by the said screw and engaging with the said disk.

3. The combination, with a base provided with a bearing-surface on its under side, of a bar supported by the said base and provided with a level, an indicating-screw which moves one end portion of the said bar vertically, a toothed indicating-disk journaled adjacent to the said screw, a friction brake device which prevents the said disk from being revolved accidentally, and a projection carried by the said screw and engaging with the said disk.

In testimony whereof I affix my signature in presence of two witnesses.

ARTHUR EDGAR HORSFALL.

Witnesses:
FRED HAMMOND,
FRANK LEWIN.